United States Patent [19]
Koh

[11] Patent Number: 5,534,883
[45] Date of Patent: Jul. 9, 1996

[54] VIDEO SIGNAL INTERFACE

[75] Inventor: Yoshihiro Koh, Tokyo, Japan

[73] Assignee: NEC Corporation, Tokyo, Japan

[21] Appl. No.: 47,207

[22] Filed: Apr. 16, 1993

[30] Foreign Application Priority Data

Apr. 24, 1992 [JP] Japan .................... 4-105119

[51] Int. Cl.$^6$ ........................................ G09G 5/00
[52] U.S. Cl. .................. 345/3; 345/89; 345/85; 345/98
[58] Field of Search ................. 345/1, 3, 98, 132, 345/154, 155, 147, 89, 185

[56] References Cited

U.S. PATENT DOCUMENTS

| | | | |
|---|---|---|---|
| 4,740,786 | 4/1988 | Smith | 345/3 |
| 4,855,728 | 8/1989 | Mano et al. | 345/3 |
| 4,860,246 | 8/1989 | Inoue | 345/3 |
| 5,218,274 | 6/1993 | Zenda | 345/3 |
| 5,309,168 | 5/1994 | Itoh et al. | 345/3 |

*Primary Examiner*—Wing F. Chan
*Assistant Examiner*—Vivian W. Chang
*Attorney, Agent, or Firm*—Sughrue, Mion, Zinn, Macpeak & Seas

[57] ABSTRACT

A video signal interface device that converts display data in serial format for a first display device, e.g. CRT display, to display data appropriate to a second display device, e.g. LCD panel. The second display device can execute binary display and carry out gray-scale display as a pseudo operation by switching with every frame. The interface comprises S/P converter means that converts the display data of serial format to parallel data, pattern generating means that holds gray-scale pattern data according to the number of gradations and outputs with every frame unit of the second display device data corresponding to the type of binary display in accordance with the gray-scale pattern data, memory means that stores display for the second display device, data generating means that generates display data of parallel format based on both the output of the pattern generating means and the displayed gradations of the converted display data, memory control means that writes data generated by the data generating means to the memory means and that reads the data from the memory means, address generating means that generates addresses for the memory means, and output means that outputs data read from the memory means at timing matched with the operation of the second display device.

13 Claims, 20 Drawing Sheets

| | 0 | 1 | | 198 | 199 | 200 | 201 | | 398 | 399 |
|---|---|---|---|---|---|---|---|---|---|---|
| 0 | A | B | | A | B | A | B | | A | B |
| 1 | B | A | | B | A | B | A | | B | A |
| 2 | A | B | | A | B | A | B | | A | B |
| 3 | B | A | | B | A | B | A | | B | A |
| 4 | A | B | | A | B | A | B | | A | B |
| 5 | B | A | | B | A | B | A | | B | A |
| 6 | A | B | | A | B | A | B | | A | B |
| 7 | B | A | | B | A | B | A | | B | A |
| ⋮ | ⋮ | ⋮ | | ⋮ | ⋮ | ⋮ | ⋮ | | ⋮ | ⋮ |
| 632 | A | B | | A | B | A | B | | A | B |
| 633 | B | A | | B | A | B | A | | B | A |
| 634 | A | B | | A | B | A | B | | A | B |
| 635 | B | A | | B | A | B | A | | B | A |
| 636 | A | B | | A | B | A | B | | A | B |
| 637 | B | A | | B | A | B | A | | B | A |
| 638 | A | B | | A | B | A | B | | A | B |
| 639 | B | A | | B | A | B | A | | B | A |

FIG.9B

| FRAME NUMBER | 1 | 2 | 3 | 4 | 5 | 6 | 7 | 8 | 9 | 10 | ... |
|---|---|---|---|---|---|---|---|---|---|---|---|
| PIXEL FOR GRAY-SCALE PATTERN A | ON P0 | OFF P4 | ON P3 | ON P2 | OFF P1 | ON P0 | OFF P4 | ON P3 | ON P2 | OFF P1 | ... |
| PIXEL FOR GRAY-SCALE PATTERN B | ON P3 | ON P2 | OFF P1 | ON P0 | OFF P4 | ON P3 | ON P2 | OFF P1 | ON P0 | OFF P4 | ... |

{ ON=1
  OFF=0

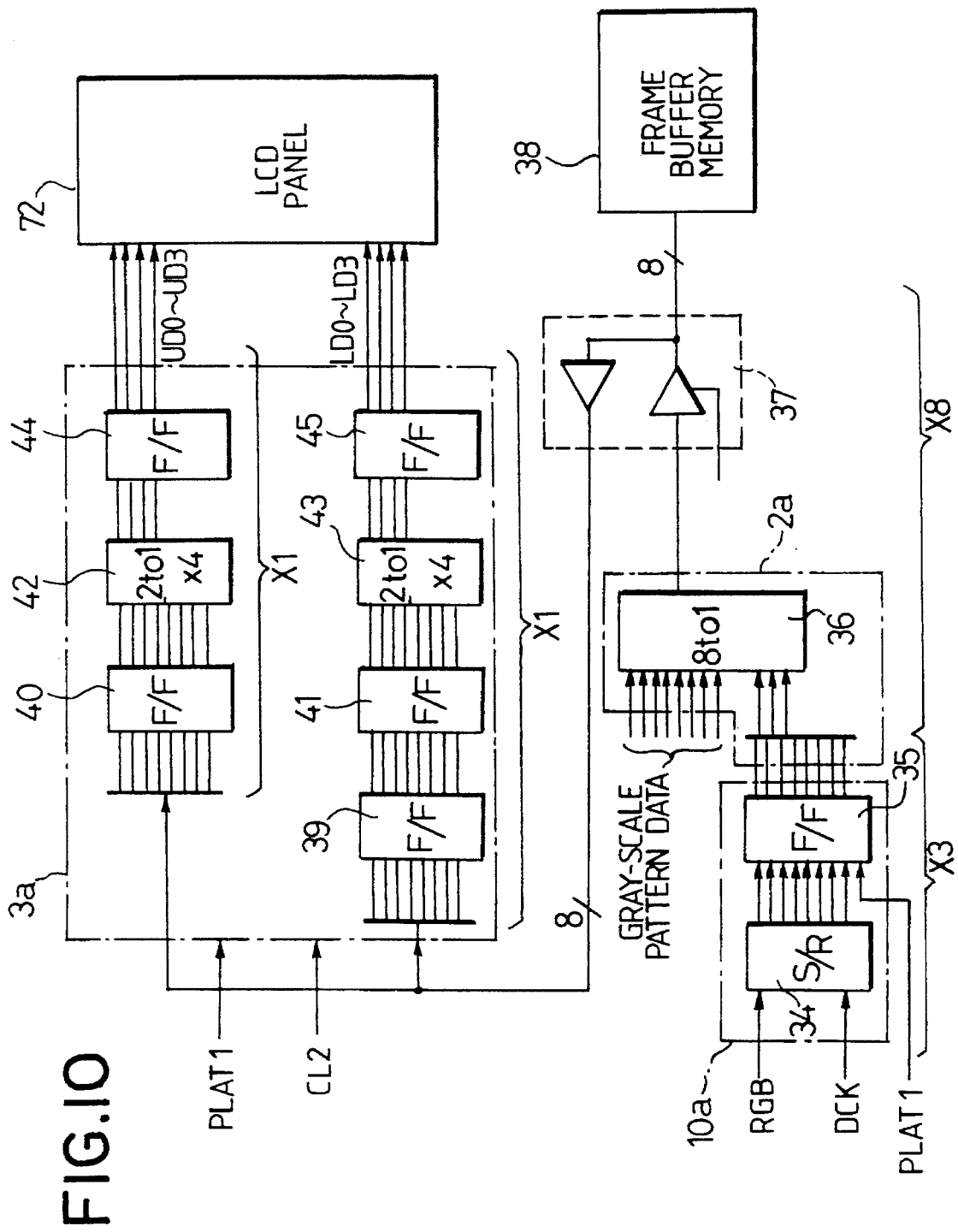

FIG.13

| | | | | | | | | | | | | | | | | LINE NUMBER |
|---|---|---|---|---|---|---|---|---|---|---|---|---|---|---|---|---|
| 4000 | 4001 | 4002 | 4003 | 4004 | 4005 | – – – | 404A | 404B | 404C | 404D | 404E | 404F | | | | 1 |
| 4050 | 4051 | 4052 | 4053 | 4054 | 4055 | – – – | 409A | 409B | 409C | 409D | 409E | 409F | | | | 2 |
| 40A0 | 40A1 | 40A2 | 40A3 | 40A4 | 40A5 | – – – | 40EA | 40EB | 40EC | 40ED | 40EE | 40EF | | | | 3 |
| 7D90 | 7D91 | 7D92 | 7D93 | 7D94 | 7D95 | – – – | 7DDA | 7DDB | 7DDC | 7DDD | 7DDE | 7DDF | | | | 198 |
| 7DE0 | 7DE1 | 7DE2 | 7DE3 | 7DE4 | 7DE5 | – – – | 7E2A | 7E2B | 7E2C | 7E2D | 7E2E | 7E2F | | | | 199 |
| 7E30 | 7E31 | 7E32 | 7E33 | 7E34 | 7E35 | – – – | 7E7A | 7E7B | 7E7C | 7E7D | 7E7E | 7E7F | | | | 200 |
| 0000 | 0001 | 0002 | 0003 | 0004 | 0005 | – – – | 004A | 004B | 004C | 004D | 004E | 004F | | | | 201 |
| 0050 | 0051 | 0052 | 0053 | 0054 | 0055 | – – – | 009A | 009B | 009C | 009D | 009E | 009F | | | | 202 |
| 00A0 | 00A1 | 00A2 | 00A3 | 00A4 | 00A5 | – – – | 00EA | 00EB | 00EC | 00ED | 00EE | 00EF | | | | 203 |
| 3D90 | 3D91 | 3D92 | 3D93 | 3D94 | 3D95 | – – – | 3DDA | 3DDB | 3DDC | 3DDD | 3DDE | 3DDF | | | | 398 |
| 3DE0 | 3DE1 | 3DE2 | 3DE3 | 3DE4 | 3DE5 | – – – | 3E2A | 3E2B | 3E2C | 3E2D | 3E2E | 3E2F | | | | 399 |
| 3E30 | 3E31 | 3E32 | 3E33 | 3E34 | 3E35 | – – – | 3E7A | 3E7B | 3E7C | 3E7D | 3E7E | 3E7F | | | | 400 |

| READ ADDRESS : | 0000 | 4000 | 0001 | 4001 | 0002 | 4002 | ---- | 0025 | 4025 | 0026 | 4026 | 0027 | 4027 |
| WRITE ADDRESS : | 4000 | 4001 | 4002 | 4003 | 4004 | 4005 | ---- | 404A | 404B | 404C | 404D | 404E | 404F |
| | 0028 | 4028 | 0029 | 4029 | 002A | 402A | ---- | 004D | 404D | 004E | 404E | 004F | 404F |
| | 4050 | 4051 | 4052 | 4053 | 4054 | 4055 | ---- | 409A | 409B | 409C | 409D | 409E | 409F |
| | | | | | | | | | | | | | |
| | 1EF0 | 5EF0 | 1EF1 | 5EF1 | 1EF2 | 5EF2 | ---- | 1F15 | 5F15 | 1F16 | 5F16 | 1F17 | 5F17 |
| | 7DE0 | 7DE1 | 7DE2 | 7DE3 | 7DE4 | 7DE5 | ---- | 7E2A | 7E2B | 7E2C | 7E2D | 7E2E | 7E2F |
| | 1F18 | 5F18 | 1F19 | 5F19 | 1F1A | 5F1A | ---- | 1F3D | 5F3D | 1F3E | 5F3E | 1F3F | 5F3F |
| | 7E30 | 7E31 | 7E32 | 7E33 | 7E34 | 7E35 | ---- | 7E7A | 7E7B | 7E7C | 7E7D | 7E7E | 7E7F |
| | 1F40 | 5F40 | 1F41 | 5F41 | 1F42 | 5F42 | ---- | 1F65 | 5F65 | 1F66 | 5F66 | 1F67 | 5F67 |
| | 0000 | 0001 | 0002 | 0003 | 0004 | 0005 | ---- | 004A | 004B | 004C | 004D | 004E | 004F |
| | 1F68 | 5F68 | 1F69 | 5F69 | 1F6A | 5F6A | ---- | 1F8D | 5F8D | 1F8E | 5F8E | 1F8F | 5F8F |
| | 0050 | 0051 | 0052 | 0053 | 0054 | 0055 | ---- | 009A | 009B | 009C | 009D | 009E | 009F |
| | | | | | | | | | | | | | |
| | 3E30 | 7E30 | 3E31 | 7E31 | 3E32 | 7E32 | ---- | 3E55 | 7E55 | 3E56 | 7E56 | 3E57 | 7E57 |
| | 3DE0 | 3DE1 | 3DE2 | 3DE3 | 3DE4 | 3DE5 | ---- | 3E2A | 3E2B | 3E2C | 3E2D | 3E2E | 3E2F |
| | 3E58 | 7E58 | 3E59 | 7E59 | 3E5A | 7E5A | ---- | 3E7D | 7E7D | 3E7E | 7E7E | 3E7F | 7E7F |
| | 3E30 | 3E31 | 3E32 | 3E33 | 3E34 | 3E35 | ---- | 3E7A | 3E7B | 3E7C | 3E7D | 3E7E | 3E7F |

| | | | | | | | | | | Line Number |
|---|---|---|---|---|---|---|---|---|---|---|
| 0000 | 0001 | 0002 | 0003 | 0004 | 0005 | — | — | 004A | 004B | 004C | 004D | 004E | 004F | 1 |
| 0050 | 0051 | 0052 | 0053 | 0054 | 0055 | — | — | 009A | 009B | 009C | 009D | 009E | 009F | 2 |
| 00A0 | 00A1 | 00A2 | 00A3 | 00A4 | 00A5 | — | — | 00EA | 00EB | 00EC | 00ED | 00EE | 00EF | 3 |
| 3D90 | 3D91 | 3D92 | 3D93 | 3D94 | 3D95 | — | — | 3DDA | 3DDB | 3DDC | 3DDD | 3DDE | 3DDF | 198 |
| 3DE0 | 3DE1 | 3DE2 | 3DE3 | 3DE4 | 3DE5 | — | — | 3E2A | 3E2B | 3E2C | 3E2D | 3E2E | 3E2F | 199 |
| 3E30 | 3E31 | 3E32 | 3E33 | 3E34 | 3E35 | — | — | 3E7A | 3E7B | 3E7C | 3E7D | 3E7E | 3E7F | 200 |
| 0000 | 0001 | 0002 | 0003 | 0004 | 0005 | — | — | 004A | 004B | 004C | 004D | 004E | 004F | 201 |
| 0050 | 0051 | 0052 | 0053 | 0054 | 0055 | — | — | 009A | 009B | 009C | 009D | 009E | 009F | 202 |
| 00A0 | 00A1 | 00A2 | 00A3 | 00A4 | 00A5 | — | — | 00EA | 00EB | 00EC | 00ED | 00EE | 00EF | 203 |
| 3D90 | 3D91 | 3D92 | 3D93 | 3D94 | 3D95 | — | — | 3DDA | 3DDB | 3DDC | 3DDD | 3DDE | 3DDF | 398 |
| 3DE0 | 3DE1 | 3DE2 | 3DE3 | 3DE4 | 3DE5 | — | — | 3E2A | 3E2B | 3E2C | 3E2D | 3E2E | 3E2F | 399 |
| 3E30 | 3E31 | 3E32 | 3E33 | 3E34 | 3E35 | — | — | 3E7A | 3E7B | 3E7C | 3E7D | 3E7E | 3E7F | 400 |

```
READ ADDRESS:  0000 0001 0002 0003 0004 0005 ---- 004A 004B 004C 004D 004E 004F
WRITE ADDRESS: 0000 0001 0002 0003 0004 0005 ---- 004A 004B 004C 004D 004E 004F 0050 0051 0052 0053 0054 0055 ---- 009A 009B 009C 009D 009E 009F
               0050 0051 0052 0053 0054 0055 ---- 009A 009B 009C 009D 009E 009F

VIDEO SIGNAL INTERFACE

BACKGROUND OF THE INVENTION

1. Field of the Invention

The present invention relates to a video signal interface, and in particular to a video signal interface used for an output display of an information processor.

2. Description of the Related Art

Display devices used as display apparatus connected to information processor include CRTs (cathode-ray tubes), LCDs (liquid crystal displays), and plasma displays. It is necessary to vary the format of the image signal that the information processor inputs to the display apparatus in accordance with the type of display device used. Generally, however, the format of the image signal or picture signal sent from the information processor is of one specific type, and as a result, in order to use a display device that is not compatible with the image signal from the information processor, it is necessary to employ an interface that converts the image signal to one that is compatible with the display device to be used.

FIG. 1 is a block diagram showing the composition of an interface for converting image signals outputted by an information processor for use by a color CRT display to signals for use by a monochrome LCD display panel. The LCD panel is used for displaying eight shades of gray. Here, the image signals for use by the color CRT are made up of three color signals (Red, Green, and Blue), a horizontal synchronous signal HSY, a vertical synchronous signal VSY, and a dot clock signal DCK, and each of these signals is inputted to the LCD video signal interface 65. In addition, a reset signal RST is also inputted to the interface 65 in order to reset the interface 65 itself. The data supplied to the LCD panel 68 from the interface 65 is LCD display data signals and LCD display timing signals.

Of the signals making up the image signal for use by a color CRT, the color signals indicate display data used when displaying on a CRT and the remaining HSY, VSY, and DCK signals are used to determine the display timing. Each color signal includes one bit for each pixel and is transmitted as serial data.

This interface 65 is connected to a memory unit 66 made up of three frame buffer memories $67_1$ to $67_3$. The frame buffer memories $67_1$ to $67_3$ are for storing in frame units the image appearing on the CRT and store the images for each constituent, red, green and blue.

The LCD video signal interface 65 comprises a timing generating circuit 60 to generate the necessary timing signals, an address generating circuit 61 for generating address signals of the frame memories $67_1$ to $67_3$ based on the output of the timing generating circuit 60, an S/P converter circuit 59 for converting the serial data of each color signal to parallel data, three bi-directional buffers $64_1$ to $64_3$ making up part of the interface and corresponding to the three frame buffer memories $67_1$ to $67_3$, a data latch circuit 62 that acquires data read out from the frame buffer memories $67_1$ to $67_3$ and synchronizes it with the LCD display timing signal, and a gray-scale pattern data producing circuit 63 that produces 8-toned gray-scale data from the three-element color signals. The timing generating circuit 60 is composed such that it produces a signal for generating addresses, LCD display timing signals, output enable signals OE, and write enable signals WE from the inputted signals HSY, VSY, RST, and DCK. The two enable signals OE and WE are signals for controlling the input and output of the frame buffer memories $67_1$ to $67_3$.

In this interface 65, the three color signals are each converted into parallel data in the S/P converter circuit 59, and the parallel data is outputted to the frame buffer memories $67_1$ to $67_3$ by way of the bi-directional buffers $64_1$ to $64_3$. In accordance with write enable signals WE and address signals, each type of display data expressed in parallel data for each of the colors, red, green and blue, is stored in each of the frame buffer memories $67_1$ to $67_3$. The data stored in the buffer memories $67_1$ to $67_3$ is read out based on the address signals and output enable signals OE and inputted to the data latch circuit 62 after being passed through the bi-directional buffer $64_1$ to $64_3$ and being synchronized with the LCD display timing signal. The display data outputted from the data latch circuit 62 is converted to gray-scale pattern data by means of the gray-scale data generating circuit 63, synchronized with the LCD display timing signal and outputted to the LCD panel 68 as LCD display data.

A one-bit color signal has three components, each color signal may represent 8 ($=2^3$) colors. Since the gray-scale also consists of eight shades, each color of the display data for the CRT will correspond to one shade among the eight gray-scales in a one-to-one fashion. The correspondence of the colors to the shades is predetermined, and the gray-scale data generating circuit 63 generates the gray-scale pattern data based on this set correspondence.

In this type of interface of the prior art, since the CRT display data is stored as is in the frame buffer memory as color signals, it is necessary to prepare a buffer memory for one screen for each of the colors, red green and blue, with the result that a total of three frame buffer memories are necessary. In addition, there is the disadvantage that, because the correspondence between the colors and the gray-scales is set and unchanging, display data that produces a good image on a CRT will not necessarily produce a good image when converted to data for display on an LCD panel.

SUMMARY OF THE INVENTION

The object of the present invention is to provide a video signal interface that can both reduce the necessary capacity of frame buffer memory and allow the most advantageous correspondence of color to shade of gray.

The above-described object is achieved by a video signal interface that converts display data in serial format for a first display device to display data appropriate to a second display device, said second display device having pixels capable of binary display and carrying out gray-scale display as a pseudo operation by switching with every frame between the binary displays to be carried out at every pixel, comprising: S/P converter means for converting said serially formatted display data to parallel data; pattern generating means for holding gray-scale pattern data according to the number of gradations that can be displayed by said second display device and outputting with every frame unit of said second display device data corresponding to the type of binary display in accordance with said gray-scale pattern data; memory means for storing said display data appropriate to said second display means; data generating means for generating display data of parallel format for use in said second display device based on both the output of said pattern generating means and the gradations of said converted display data; memory control means for writing data generated by said data generating means to said memory means and for reading the data from said memory means;

address generating means for generating address corresponding to said memory means; and output means for outputting data read from said memory means at timing matched with the operation of said second display device.

The above and other objects, features and advantages of the present invent/on will become apparent from following description referring to the accompanying drawings which illustrate examples of preferred embodiments of the present invention.

BRIEF DESCRIPTION OF THE DRAWINGS

FIG. 3 shows the correspondence between each pixel of an LCD panel and LCD display data signals;

FIG. 4 shows the correspondence between each pixel of an LCD panel and the gray-scale pattern applied at that pixel;

FIG. 9B is a timing chart illustrating an example of a gray-scale pattern;

FIG. 10 is a block diagram showing the composition of a data controller of a video signal interface of the second embodiment of the present invention;

FIG. 13 shows the relation between each pixel of the LCD panel and frame buffer memory address in the second embodiment;

FIG. 14 shows the relation between read addresses and write addresses of the frame buffer memory in the second embodiment;

FIG. 18 shows the relation between each pixel of the LCD panel and frame buffer memory address in the third embodiment; and FIG. 19 shows the correspondence between read addresses and write addresses of the frame buffer memory in the third embodiment.

DETAILED DESCRIPTION OF THE PREFERRED EMBODIMENTS

Preferred embodiments of the present Invention will be described in conjunction with the drawings, beginning with the first embodiment of an LCD video signal interface of the present invention.

Figure 1:
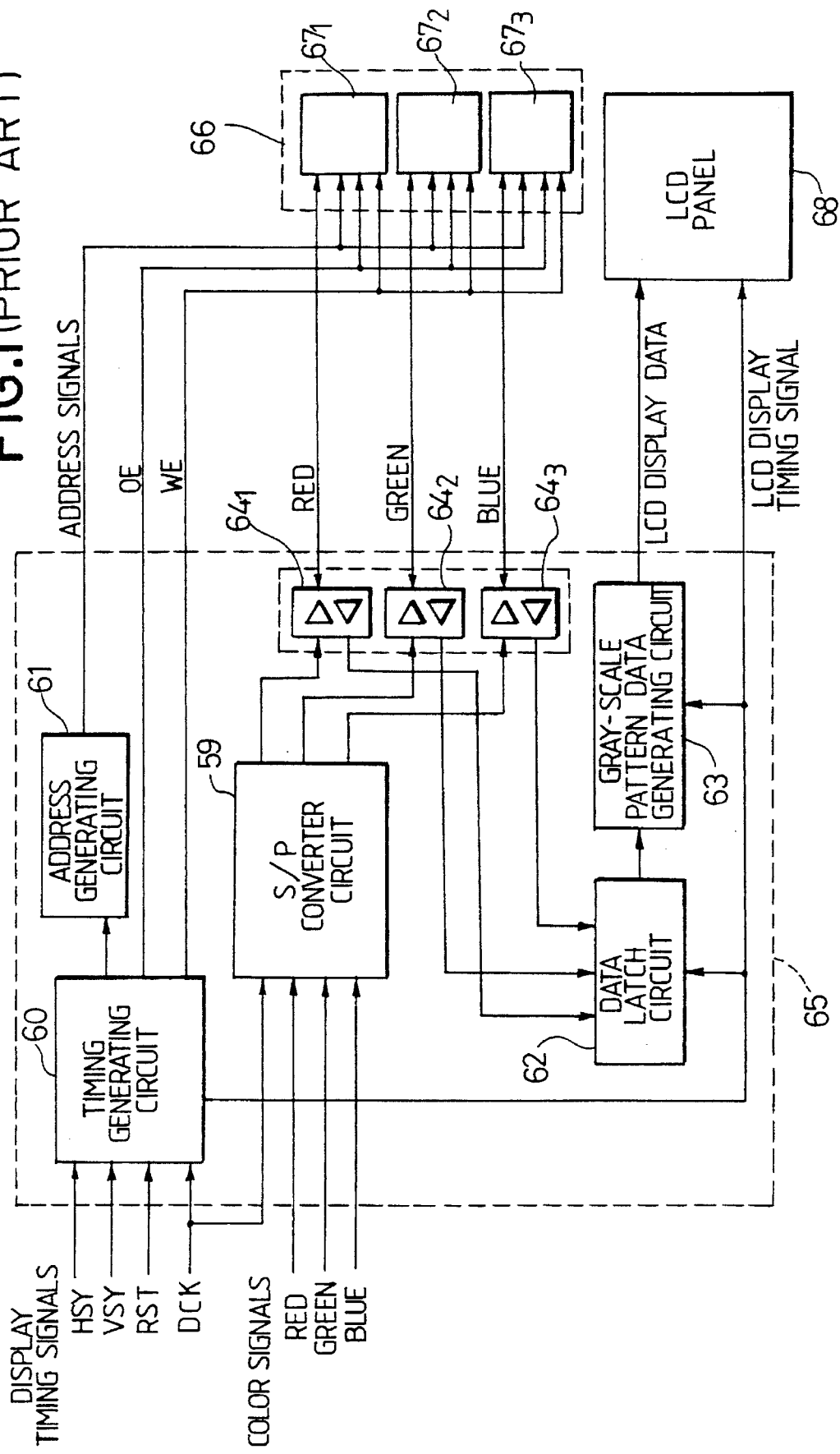
FIG. 1 is a block diagram illustrating the composition of an LCD video signal interface of the prior art.
Figure 2:
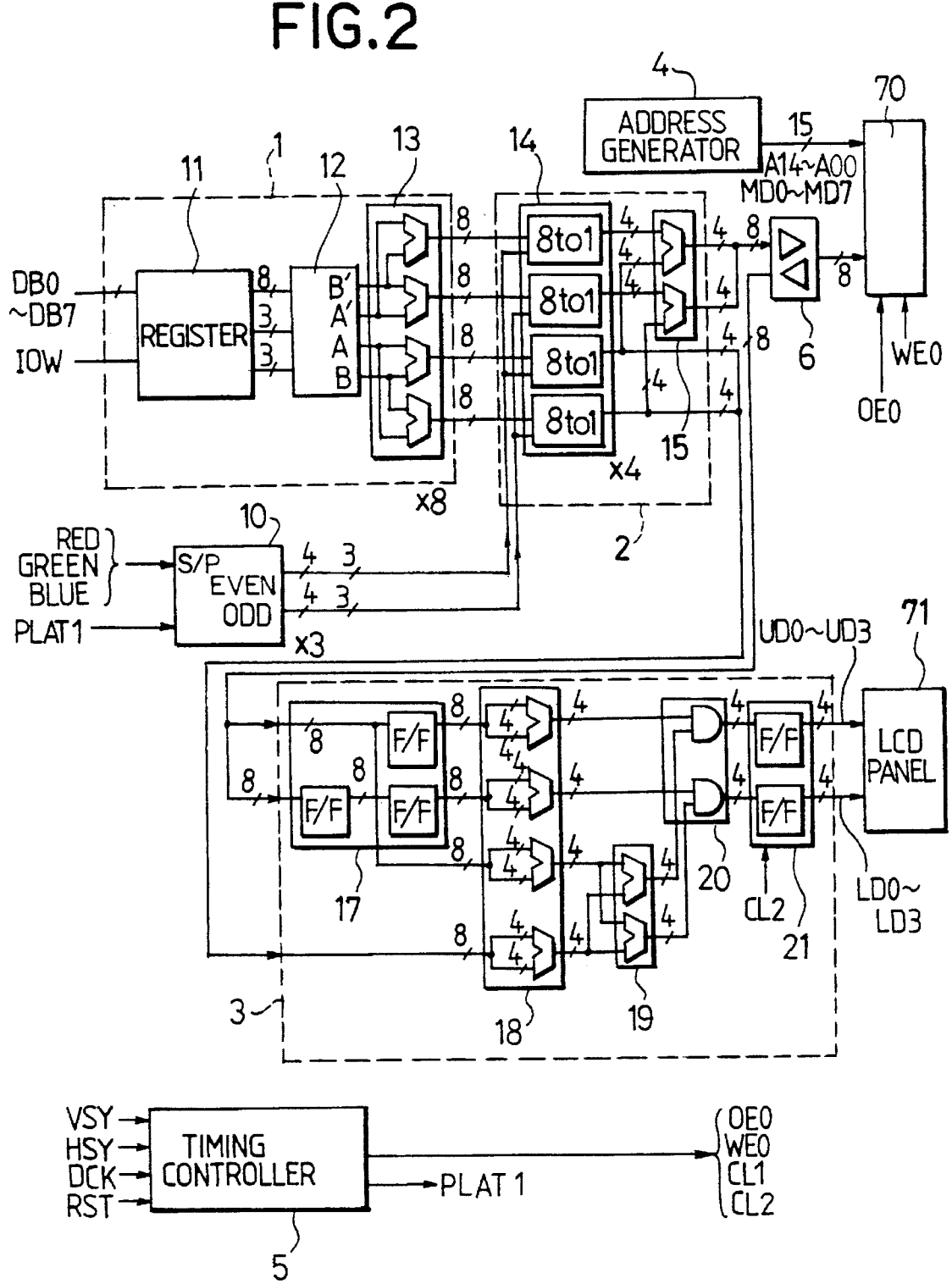
FIG. 2 is a block diagram illustrating the composition of a first embodiment of an LCD video signal interface of the present invention.

The interface shown In FIG. 2 is for the purpose of displaying image display data for a color CRT having one bit per pixel for each color, red, green and blue, on a monochrome LCD panel 71. Signals sent from devices such as information processors for display on a color CRT will hereinafter be referred to as display video signals.

In this ease, explanation will be presented regarding a case in which signals for display on an LCD panel 71 with 640 horizontal dots and 400 vertical dots are generated from display video signals for display on a color CRT with 640 horizontals dots and 400 vertical dots. The LCD panel 71 has pixels capable of binary display and is used for carrying out 8-gray-scale display as a pseudo operation by switching with every frame between the binary displays to be carried out at every pixel. This LCD panel 71 is driven by a dynamic display method in which a drive circuit is provided for both the upper and lower halves of the panel. In this panel 71, data corresponding to the upper half of the screen (UD3 to UD0) and data corresponding to the lower half of the screen (LD3 to LD0) are displayed at the same timing with 4 bits for each. FIG. 3 illustrates the manner in which each pixel in the LCD panel 71 is correlated with the LCD data (UD3 to UD0, LD3 to LD0) that drives the pixel. For example, each pixel labeled "UD2" is driven cyclically by LCD data UD2.

In addition, the interface of the present embodiment is provided with four types of gray-scale patterns, A, A', B, and B'. These gray-scale patterns determine the correspondence between the eight colors to be displayed on the CRT and the eight gray-scales of the LCD panel 71. When displaying a particular frame, a neighboring pixel to one side in the LCD panel 71 will be displayed with gray-scale pattern A, and the pixel on the other side will be displayed with gray-scale pattern B. Regarding the next frame, the pixel displayed with gray-scale pattern A will be displayed with gray-scale pattern A', and the pixel displayed with gray-scale pattern B will be displayed with gray-scale pattern B'. In other words, gray-scale patterns A and B and gray-scale patterns A' and B' are used alternately. The allocation of the gray-scale patterns to each pixel for the screen in which gray-scale patterns A and B are used is shown in FIG. 4. As will subsequently be explained, the gray-scale pattern can be arbitrarily set from the outside, and as a result, it is possible to make gray-scale pattern A and B exactly the same or different.

The present video signal interface is composed of eight gray-scale pattern generators 1 to correspond to each gradation of gray, a memory controller 2, an LCD controller 3, an address generator 4, a timing controller 5, a bi-directional buffer 6, and three S/P converters 10 corresponding to the three constituent color signals. The bi-directional buffer 6 is connected to the frame buffer memory 70, and the addresses within the frame buffer memory 70 are designated by the 15-bit address A14 to A00 outputted by the address generator 4. The LCD display data U00 to U03 and L00 to L03 is outputted by the controller 3.

In FIG. 2, only one gray-scale pattern generator 1 and one S/P converter 10 are shown for the sake of simplifying the diagram. However, because the number of signal lines making up the signal line outputted by this gray-scale pattern generator 1 and S/P converter 10 is noted, one skilled in the art would be able to easily determine the connections of the wiring to each of the eight gray-scale pattern generators 1 and three S/P converters 10.

Each gray-scale pattern generator 1 comprises a register 11 that inputs both 8-bit data signals DB0 to DB7 from the outside system for control and a write instruction signal IOW, a gray-scale data generator circuit 12 that generates gray-scale pattern data, and a selector 13. The register 11 is capable of setting data signals DB0_DB7 synchronized with write instruction signal IOW. The register 11, by twice receiving I/O access from an outside system such as a CPU, is able to set gray-scale pattern information that can be represented in 8 bits, information regarding pattern length that can be represented in 3 bits, and information of 3-bit length that indicates by bit units the gap between gray-scale pattern B and gray-scale pattern A. The gray-scale data generating circuit 12 generates the above-described four types of gray-scale patterns A, B, A', and B', based on the information established in the register 11. The selector 13 comprises four 2-to-1 multiplexer elements and is provided for the purpose of alternately switching gray-scale patterns A', B' and alternately switching gray-scale patterns A, B depending on whether the timing is for displaying an even line on the screen or for displaying an odd line on the screen.

Each S/P converter 10 takes in the display video signal in serial format originally intended for output to the CRT and converts this display data to parallel format. Each S/P converter 10 receives an input of signal PLAT1 for control and red, green or blue display data. Parallel data (of 8-bit width) is outputted from the S/P converters 10, and in order to choose either gray-scale pattern A or gray-scale pattern B, this parallel data is split between each even-bit and odd-bit signal line EVEN, ODD. Each signal line EVEN, ODD is of 4-bit width.

The memory controller 2 is composed of selectors 14 and 15. Selector 14 is provided for the purpose of selecting one output from among the eight gray-scale pattern generators 1 in response to data outputted from the three S/P converters 10. The selector 14 are composed of four 8-to-1 multiplexers. These four multiplexers correspond to each of the gray-scale patterns A, B, A', B'. In addition, because the even-bit and odd-bit signal lines EVEN, ODD are each of 4-bit width, four selectors 14 are provided. In other words, a first selector 14 is provided to correspond to the first bit of each signal line EVEN, ODD, and a second selector 14 is provided to correspond to the second bit.

Selector 15 is provided on the output side of selector 14. Selector 15 is provided for the purpose of switching between gray-scale patterns A, B and gray-scale patterns A', B'. This type of gray-scale pattern switching is provided because the gray-scale pattern data written to the frame buffer memory 70 is different for each frame. The output of selector 15 is transmitted to the bi-directional buffer 6 as the output of that memory controller 2. The output of the 8-to-1 multiplexers making up each of the selectors 14 and corresponding to gray-scale pattern A, B is also extracted to outside the memory controller 2.

The bi-direction buffer 6 is of 8-bit width. The bi-directional buffer 6 is provided for the purpose of transmitting the output of selector 15 of the memory controller 2 to the frame buffer memories 70 and transmitting the outputted data from the frame buffer memories 70 to the LCD controller 3. The data sent between the bi-directional buffer 6 and the frame buffer memory 70 is the gray-scale pattern data MD0 to MD7, and as will later be explained, writing and reading of the gray-scale pattern data is performed in the frame buffer memory 70 based on the address signals A14 to A00 produced by the memory address generator 4, the output enable signal OE0 generated by the timing controller 5, and the write enable signal WE0.

The timing controller 5 generates each of the timing signals necessary for this interface. The vertical synchronous signal VSY, horizontal synchronous signal HSY, dot clock signal DCK, and reset signal RST are inputted to the timing controller 5 from the outside system. On the basis of these inputted signals, the timing controller 5 then generates signal PLAT1, output enable signal OE0 to the frame buffer memory 70, write enable signal WE0 to the frame buffer memory 70, line clock signal CL1 to the LCD panel 71, and shift clock signal CL2 to the LCD panel 71.

The memory address generator 4 is provided for generating addresses to the frame buffer memory 70. At the memory address generator 4, address signals A14 to A00 of 15-bit width are generated.

The LCD controller 3 is composed of registers 17, 21, selectors 18, 19, and an AND circuit 20. Register 17 is provided for the purpose of taking the gray-scale pattern data of 8-bit width read out from the frame buffer memory 70 by means of the bi-directional buffer 6. Within register 17 are provided three latch circuits of 8-bit width, and the read out gray-scale pattern data, the gray-scale pattern data read out 1 clock cycle before, and the gray-scale pattern data read out 2 clock cycles before are all outputted by register 17. Selector 18 is provided for the purpose of dividing the gray-scale pattern data of 8-bit width into 4 bits to be displayed first and 4 bits to be displayed after. Because display on the LCD panel 71 is divided between the upper screen and the lower screen, four groups of selection elements are provided in selector 18.

Selector 19 is provided for the purpose of switching between the outputs of the two lower ports shown in the lower part of the figure from among the output of the four ports of selector 18 depending on whether the CRT display is within the upper 200 lines of the screen or the lower 200 lines of the screen. The output of the 2 ports of the upper part of the figure of selector 18 and the output of selector 19 are inputted to the AND circuit 20. This AND circuit 20 operates as the selector for making the final switching of the gray-scale pattern of the data displayed on the LCD panel 71. The output of the AND circuit 20 is outputted to the LCD panel 71 as the LCD display data by means of a register 21. Within register 21 are provided two latch circuits of 4-bit width that operate synchronously with the shift clock CL2. The output of register 21 is of 8-bit width made up of the upper screen display data UD0 to UD3 of 4-bit width and the lower screen display data LD0 to LD3 of 4-bit width.

Figure 5A:
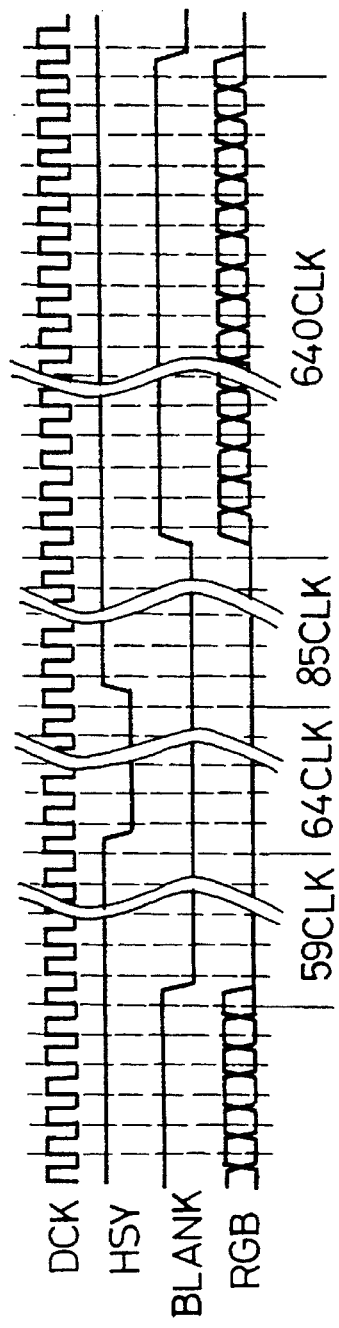
FIG. 5A is a timing chart showing the relations among a dot clock signal, a horizontal synchronous signal, a blank signal, and a color signal.
Figure 5B:
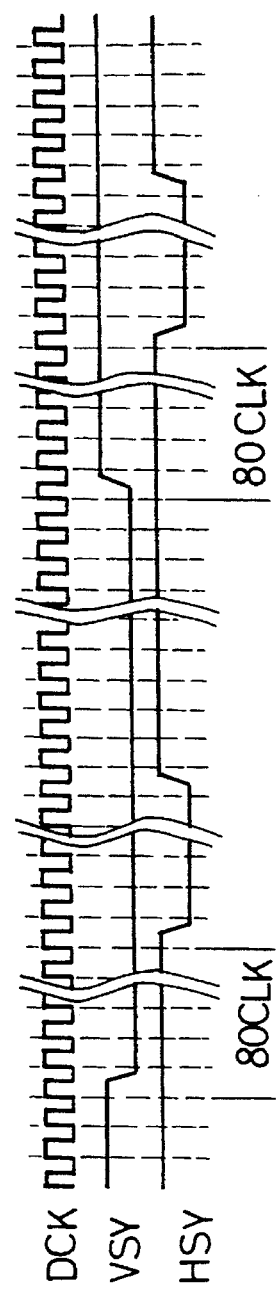
FIG. 5B is a timing chart showing the relations among a dot clock signal, a vertical synchronous signal, and a horizontal synchronous signal.
Figure 5C:
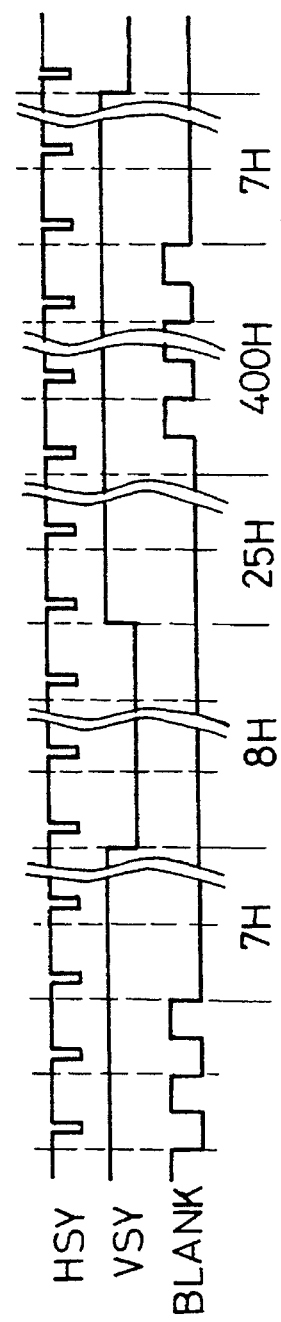
FIG. 5C is a timing chart showing the relations among a horizontal synchronous signal, a vertical synchronous signal, and a blank signal.

Explanation will next be given regarding the picture (image) signals for a color CRT. FIGS. 5A to 5C are timing charts illustrating the interrelation of each component of the image signal. Signal BLANK is the display erasing signal of the CRT, and RGB ordinarily represents the display data for red, green and blue. "59CLK" indicates that the period is equivalent to 59 cycles of the dot clock signal DCK, and "7H" indicates that the period is equivalent to 7 cycles of the horizontal synchronous signal HSY. All of the signals mentioned here are generally used for a 640-dot×400-line display and the interrelation between each of the signals would be readily understood by one of ordinary skill in the art.

Figure 6:
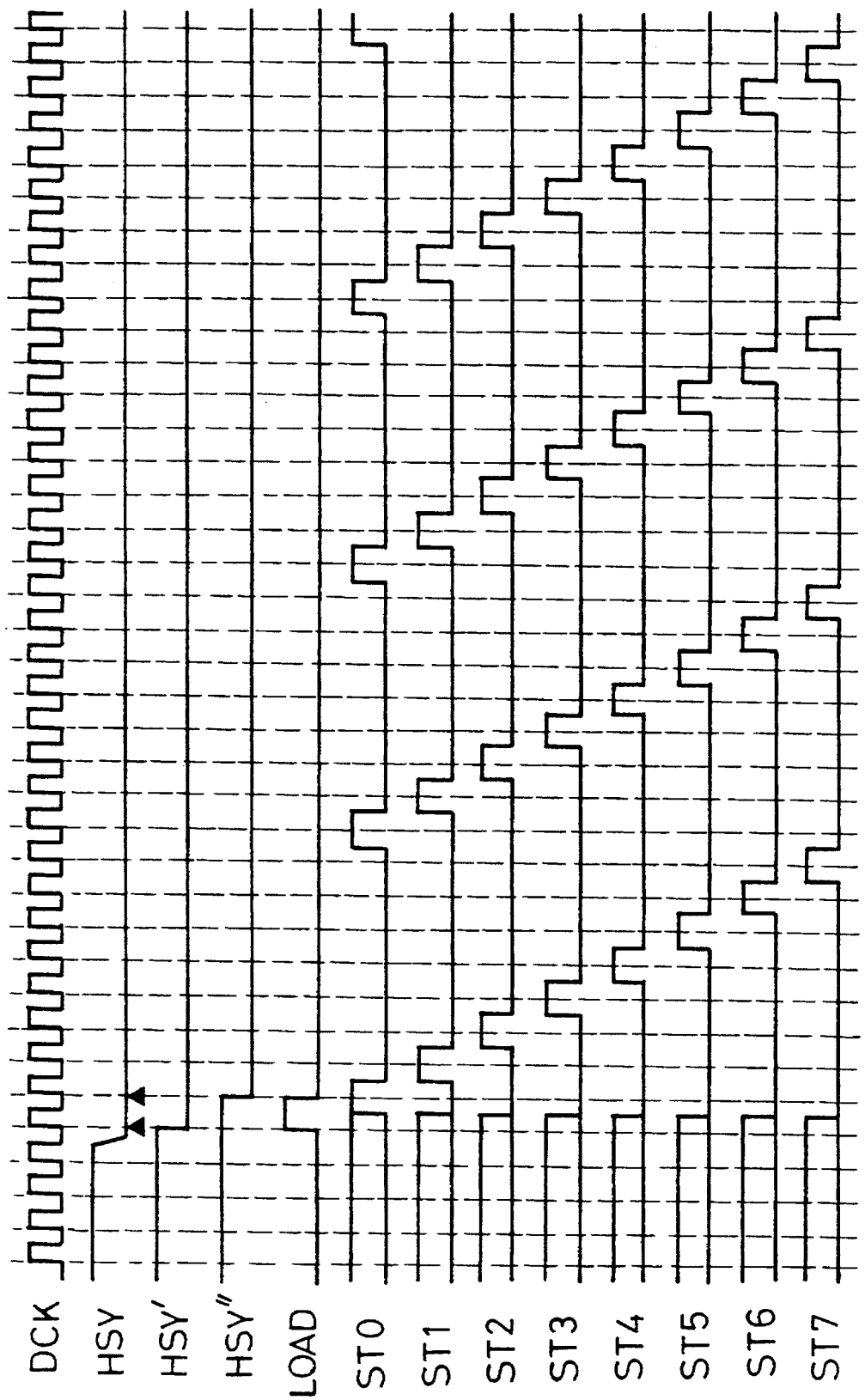
FIG. 6 is a timing chart showing each status signal generated by the timing control unit.

Next will be explained the generation of status signals in the interface of the present invention. In this interface, because display data in serial format is converted to parallel data of 8-bit width, eight status signals ST0 to ST7 are employed to establish correspondence between the data of serial format with the data of parallel format. FIG. 6 shows the timing of the generation of these status signals ST0 to ST7.

Each of the status signals ST0_ST7 is a pulse signal, each of the length of one cycle of the dot clock signal DCK, and one of these status signals ST0_ST7 is "1" while the other seven are "0". Here, each of the status signals shows "1" in a progression beginning with ST0, and at the timing succeeding the display of "1" by ST7, ST0 shows "1". In addition, sampling of horizontal synchronous signal HSY is always carried out during the rise time of dot clock signal DCK, and based on this sampling, signal HSY' is generated. Signal HSY" is generated by delaying signal HSY' by one cycle of the dot clock signal DCK. By performing an exclusive-OR operation on these signals HSY' and HSY", signal LOAD is generated. Signal LOAD is a signal Indicating the point of origin of each display scan line and is used in the initialization of status signals ST0 to ST7.

Figure 7A:
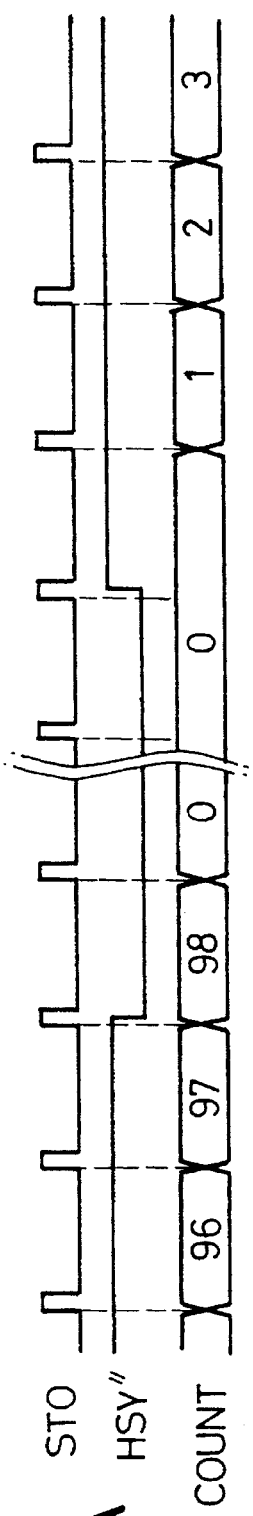
FIG. 7A is a timing chart illustrating the operation of the X counter.
Figure 7B:
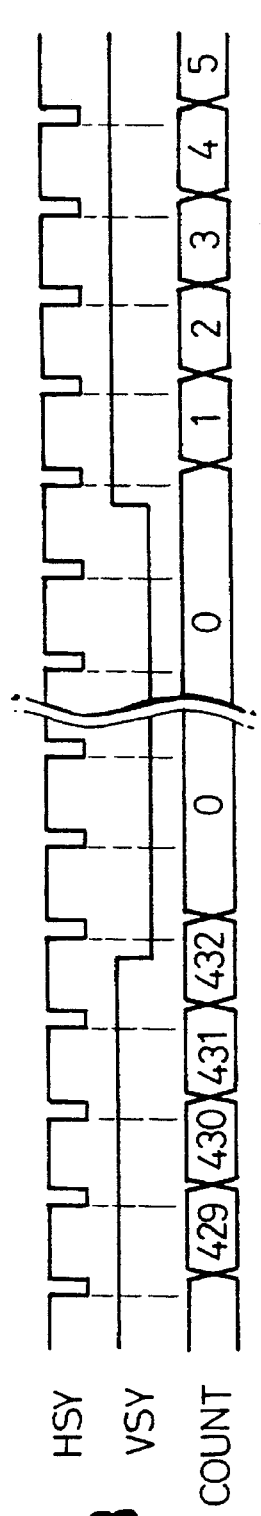
FIG. 7B is a timing chart illustrating the operation of the Y counter.

In this interface are also provided a horizontal counter (X counter) that uses status signal ST0 as a clock signal and HSY" as a load signal and a vertical blanking counter (Y counter) that uses horizontal synchronous signal HSY as a clock signal and a vertical synchronous signal VSY as a load signal. FIG. 7A illustrates the operation timing of the X counter and FIG. 7B shows the operation timing of the Y counter.

The values shown by the X counter and Y counter indicate which point on the screen the present display data corresponds to. In fact, however, when displaying an image on a CRT, before and after one displayed line there is a timing at which display is not performed, and moreover, because of the existence of a vertical interval, the value of the X counter and the value of the Y counter do not show the coordinates on the screen. The coordinates on the screen can be learned by deducting a suitable offset value from these counter values. The timing controller 5 outputs the status signal ST4 unaltered as signal PLAT1 when the both X-counter value is within the range of 11 to 90 and the Y-counter value is within the range 26 to 425.

Figure 8A:
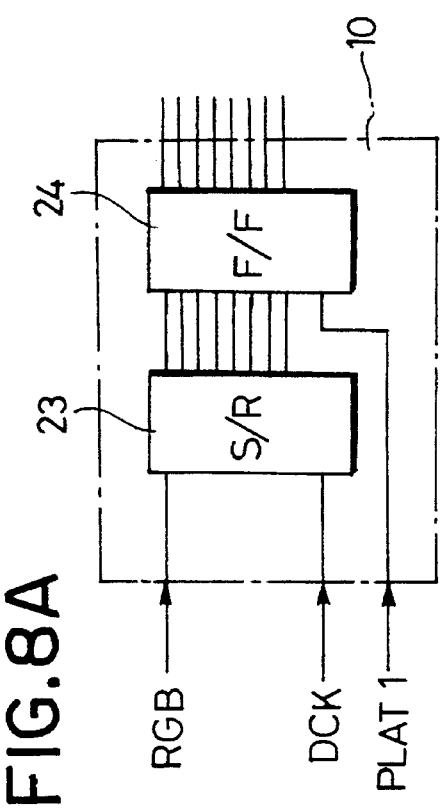
FIG. 8A is a circuit diagram showing the composition of an S/P converter.

Further explanation will be given regarding the S/P converter 10. FIG. 8A is a circuit diagram showing the composition of each of the S/P converters 10. The S/P converters 10 comprise a shift register 23 of 8-bit width that inputs any of the red, green or blue display data and operates synchronously with the dot clock signal DCK and a latch circuit 24 of 8-bit width provided on the output side of the shift register 23. The latch circuit 24 operates in synchronization with the signal PLAT1.

Figure 8B:
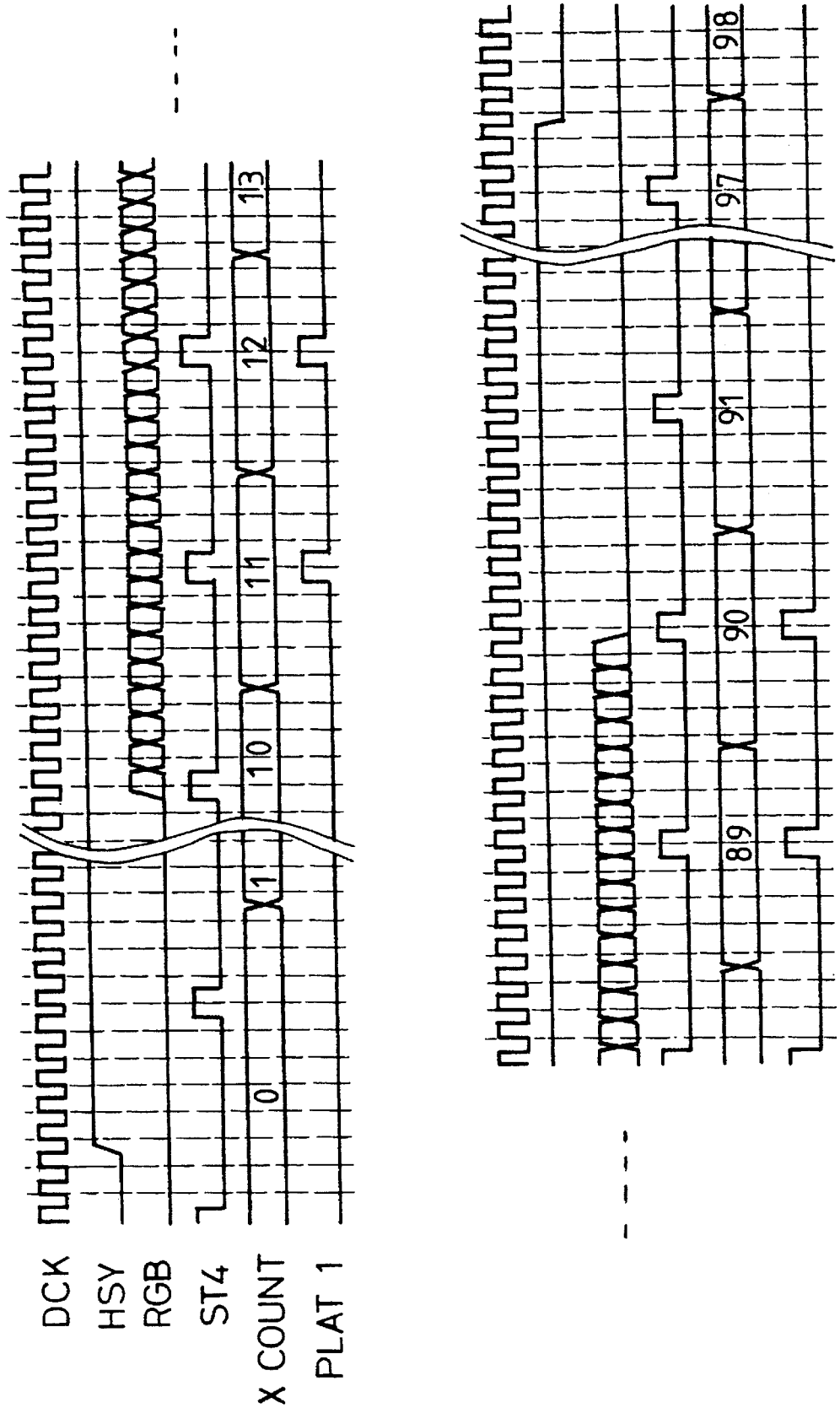
FIG. 8B is a timing chart illustrating the operation of an S/P converter.

FIG. 8B is a timing chart illustrating the operation of the S/P converter 10. Serially formatted data for use in a CRT display is taken into a shift register in synchronization with the dot clock signal DCK and converted into signals of 8-bit width. As data of 8-bit width, it is taken into the latch circuit 24 by means of signal PLAT1 and outputted. Because the time cycle of signal PLAT1 is clearly equal to eight cycles of the dot clock signal DCK, in this way the conversion of serial data to parallel data is carried out.

Figure 9A:
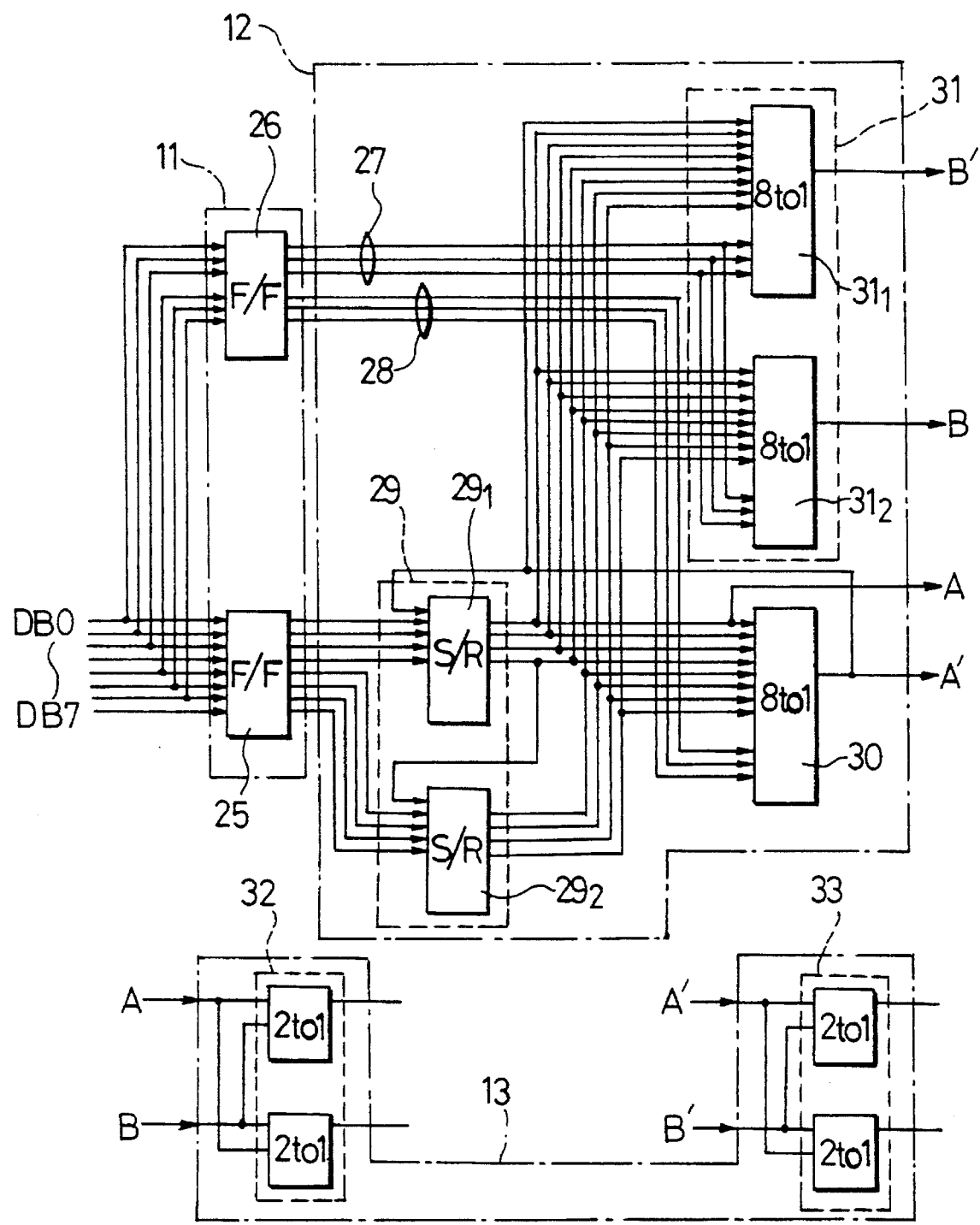
FIG. 9A is a circuit diagram showing the composition of a gray-scale pattern generator.

The composition of gray-scale pattern generator 1 will next be explained with reference to FIG. 9A. A register 11 is composed of two latch circuits 25 and 26. One latch circuit, 25 is provided for the purpose of obtaining data DB0 to DB7, and the other latch circuit 26 is provided for the purpose of taking in data DB0 to DB2 and DB4 to DB6. The gray-scale data generator 12 is composed of two shift registers $29_1$ and $29_2$ and three 8-to-1 selectors 30, $31_1$ and $32_2$. Each of the shift registers $29_1$ and $29_2$ is of 5-bit input and 4-bit output, and in one shift register $29_1$ is inputted both the lower 4 bits of one of the latch circuits 25 within the register 11 and the output of 8-to-1 selector 30. Into the other shift register $29_2$ is inputted the upper 4 bits of the latch circuit 25 and the uppermost of the bit of one shift register $29_1$.

The 8-to-1 selectors $31_1$ and $31_2$ carry out selection based on the 3 bits of output 27 corresponding to data lines DB0 to DB2 from the output of the other latch circuit 26 within the register 11. Into the 8-to-1 selector $31_1$ is inputted, from the side of the lowermost bit, the output of the selector 30 (1 bit), the output of one shift register $29_1$ (4 bits), and the output of the other shift register $29_2$ other than the uppermost bit (3 bits). Into the 8-to-1 selector $31_2$ is inputted, from the side of the lowermost bit, the output of one shift register $29_1$ (4 bits) and the output of the other shift register $29_2$ (4 bits).

The 8-to-1 selector 30 carries out selection based on the 3 bits of output 28 corresponding to data lines DB4 to DB6 from the output of the latch circuit 26. Into this selector 30 is inputted, from the side of the lowermost bit, the output of one shift register $29_1$ and the output of the other shift register $29_2$.

By means of this constitution, the output of selector $31_1$ indicates the gray-scale pattern B', the output of selector $31_2$ indicates gray-scale pattern B, the output of the lowermost bit of one shift register $29_1$ indicates the gray-scale pattern A, and the output of selector 30 indicates gray-scale pattern B. Below will be explained the operation of each of the gray-scale pattern generators 1.

Information on the 8-bit gray-scale pattern is stored beforehand into one latch circuit 25 within register 11 from an outside system through an I/O access. In the other latch circuit 26 is determined in advance information on the divergence between gray-scale pattern A and gray-scale pattern B as 3 bits of data DB0 to DB2 and information 28 on the pattern length as 3 bits of data DB4 to DB6.

Based on the information on the gray-scale patterns, eight types of shift data are produced in the shift registers $29_1$ and $29_2$ within the gray-scale data generator 12 by means of the clock signal that change by frame unit. This shift data is selected by 8-to-1 selector 30 based on the pattern length information (signal line 28) and then outputted as gray-scale pattern A'. The lowermost bit of the shift data is generated as gray scale pattern A.

Based on the divergence Information (signal line 27), selection from the lower 7 bits of the shift data and gray-scale pattern A' is carried out at selector $31_1$ and gray scale-pattern B' is generated. In the same way, selection of shift data is carried out at the selector $31_2$ based on the divergence information and gray-scale pattern B is generated.

For each gray-scale pattern generated in this way, in order to achieve display based on the correlation between the gray-scale pattern and the display positions on the LCD panel 71 (refer to FIG. 4), selection is performed by each of the 2-to-1 multiplexers within selector 13 depending on whether display is carried out for the even lines or for the odd lines.

FIG. 9B shows an example of a gray-scale pattern in which the gray-scale pattern data is "00001101", the pattern length is 5, and the divergence between gray-scale pattern A and B is 3. FIG. 9B illustrates which one of binary data (ON and OFF) is displayed at each pixel corresponding to the gray-scale pattern A or B within successive frames. Thus, the pseudo gray-scale display operation is achieved.

Gray-scale pattern data produced in this manner is stored in frame buffer memory 70. The display can then be carried out on the LCD panel 71 by means of the LCD controller 3 by reading out the stored data. In the case of the present embodiment, the gray-scale pattern data is produced according to the contents stored in register 11, and as a result, it is possible to achieve an ideal gray-scale pattern according to the content of the display data and the particular LCD panel 71 used.

Next, a second embodiment of interface of the present invention will be described. FIG. 10 is a block diagram showing the composition of the data control system of the present embodiment. Compared with the interface shown in FIG. 2, this interface has a different S/P converter, LCD controller, and memory controller. In addition, as an interface for inputting and outputting data to the frame buffer memory 38, eight bi-directional buffers of 1-bit width 37 are provided. Regarding the timing controller for generating various signals necessary for the interface, this controller has no differences with the controller shown In FIG. 2, and the controller shown in FIG. 2 can be used as is. In the following explanation, the addresses of the frame buffer memory 38 are given in hexadecimal notation.

Explanation will first be given regarding the S/P converters 10a. One S/P converter 10a is provided for each of the three colors, red, green and blue. Each S/P converter 10a has a shift register 34 of 8-bit width and a latch circuit 35 of 8-bit width. A difference with the S/P converter 10 shown in FIG. 8a is that the output is not split between even bits and odd bits.

One memory controller 2a is provided for each bit of each output data line (of 8-bit width) of the S/P converter 10a, for a total of eight. An 8-to-1 selector 36 is provided in each memory controller 2a. Gray-scale data (of 8-bit width) from the gray-scale pattern generator is inputted to the data input terminal of this selector 36. In addition, based on the signals inputted from these three data lines, each data line being outputted from each S/P converter 10a, the selector 36 carries out the selection operation. The output (of 1-bit width) from each memory controller 2a is connected to the frame buffer memory 38 by means of a respective bi-directional buffer 37. The frame buffer memory 38 is a 256 Kbit (32 Kbyte) memory. The area within the frame buffer memory 38 from the 0000 address to the 3E7F address is used for storing the gray-scale pattern data corresponding to the CRT display data for the lower half of the screen, and the area from address 4000 to address 7E7F is used to store the gray-scale pattern data corresponding to the upper half of the screen.

Data signals of 8-bit width from the frame buffer memory 38 are inputted to the LCD controller 3a by way of respective bi-directional buffers 37. The LCD controller 3a comprises three registers of 8-bit width 39, 40 and 41, two registers of 4-bit width 44 and 45, and two selectors 42 and 43. Registers 39_41 are latch circuits synchronous with signal PLAT1, and registers 44 and 45 are latch circuits synchronous with shift clock signal CL2. 8-bit parallel data from the frame buffer memory 38 is inputted to the two registers 39 and 40. Register 41 is provided on the output side of register 39. The out puts of registers 40 and 41 are connected to registers 44 and 45 by means of selectors 42 and 43, respectively. Each of the selectors 42 and 43 are equipped with four 2-to-1 selector elements, and as will be explained hereinafter, are used to simultaneously display the data for the upper half of the screen and the data for the lower half of the screen. The outputs of registers 44 and 45 are outputted to the LCD panel 72 as upper screen display data UD0 to UD3 and lower screen display data LD0 to LD3.

Figure 11:
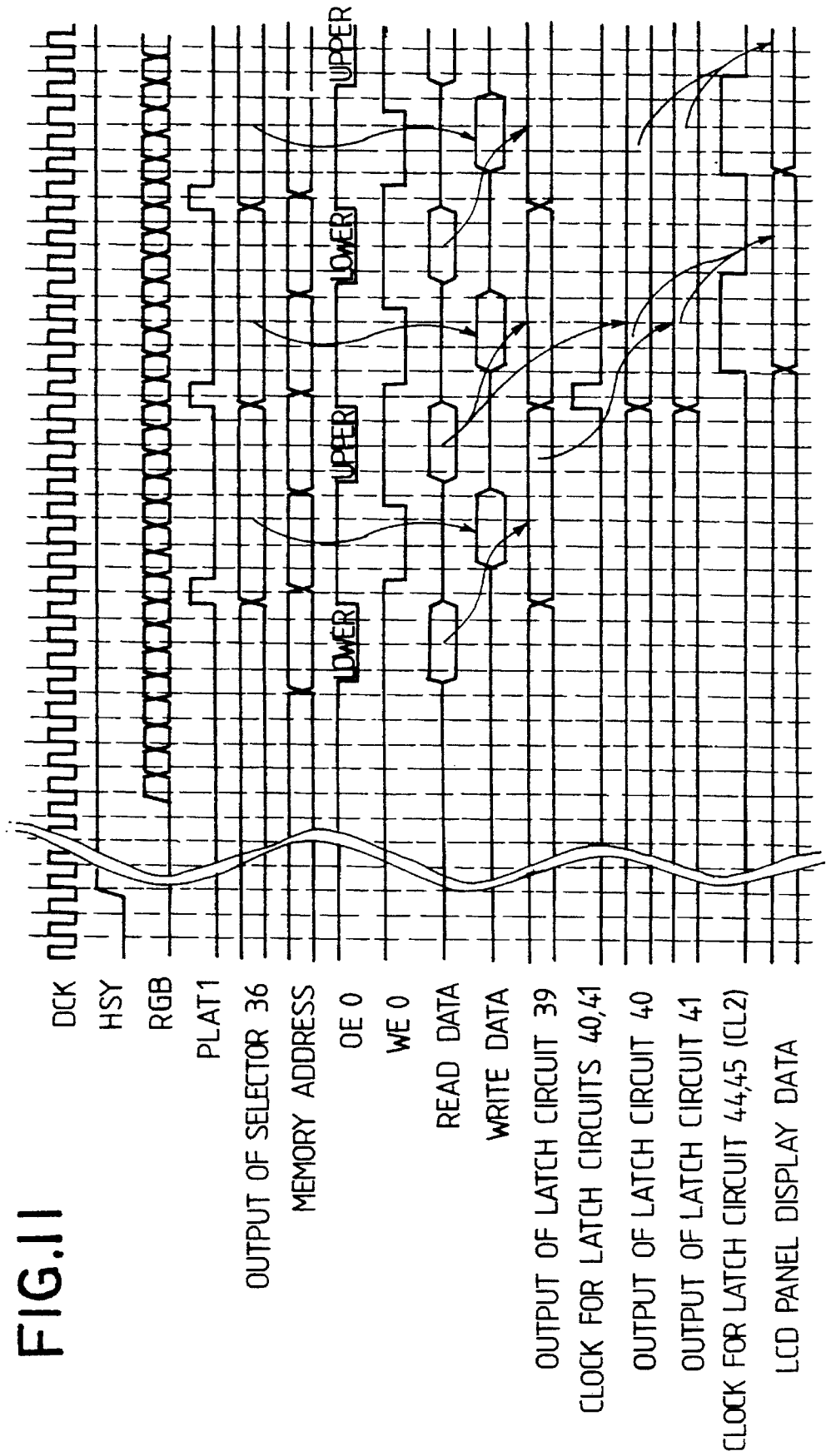
FIG. 11 is a timing chart showing the operation of the device shown in FIG. 10 in relation to the display data corresponding to the first portion of each scan line.
Figure 12:
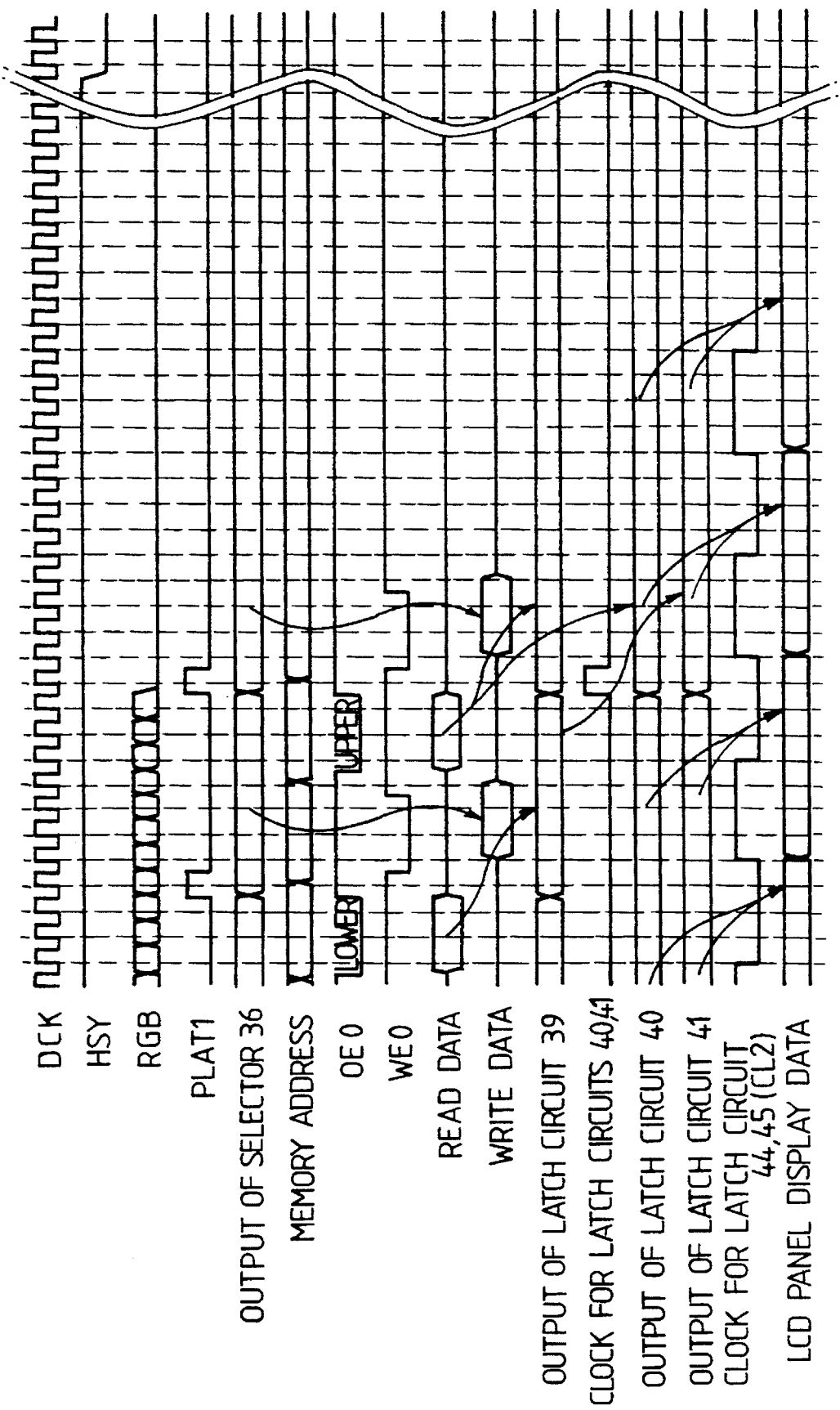
FIG. 12 is a timing chart showing the operation of the device shown in FIG. 10 in relation to the display data corresponding to the last portion of each scan line.

Next will be explained the conversion of the display data for CRT use to display data for LCD use. FIGS. 11 and 12 are timing charts illustrating operation upon inputted display data for CRT use. FIG. 11 corresponds to the leading portion of each display data line, and FIG. 12 corresponds to the trailing portion of each display data line.

Display data for CRT use is synchronized with dot clock signal DCK and taken into the shift register 34 of the S/P converters 10a. The data from the 0000 address corresponding to the lower half of the screen is read from the frame buffer memory 38 in accordance with output enable signal OE0. Synchronous with signal PLAT1, the display data converted into 8-bit width is taken into register 35 of the S/P converter 10a, and at the same time, the data read from the 0000 address of the buffer memory 38 is taken into register 39 of the LCD controller 3a.

The selector 36 of the memory controller 2a selects the gray-scale data (of 8-bit width) based on the display data for CRT use. The selected gray-scale pattern data is written to the 4000 address of the frame buffer memory 38 in accordance with the write enable signal WE0. This address corresponds to the upper half of the screen. At this time, the gray-scale pattern data displayed in the upper half of the LCD panel 72 and the gray-scale pattern data displayed in the lower half of the LCD panel 72 are complete.

Four dots are displayed on both the upper half and lower half of the LCD panel 72 at the same timing. At this point, selection is made of the upper four bits or the lower four bits of the eight bits according to selectors 42 and 43 within the LCD controller 3a. The gray-scale pattern, made 4 bits wide, is synchronized with shift clock CL2 and outputted to the LCD panel 72 by means of registers 44 and 45.

The operations are carried out for the next address in the same manner. By repeating this operation cycle, one screenful of display data for the LCD panel is generated by inputting a screenful of display data for a CRT. Because the frame frequency of the LCD panel has been made equivalent to the frame frequency of the CRT, the capacity of the frame buffer memory can be made smaller than the capacity used in video signal devices of the prior art.

The relation between the display position on the LCD panel 72 and the address within the frame buffer memory 38 is as shown in FIG. 13. In this figure, the "4000" in the upper left corner is the data corresponding to the first 8 dots in the highest display line and indicates that the data is stored in the 4000 address.

In this interface device, writing and reading of data to the frame buffer memory 38 are carried out alternately. FIG. 14 illustrates the manner in which the read address and the write address change. In display data for CRT use, since data corresponding to the lower half of the screen is outputted after completion of the entire output of data corresponding to the upper half of the screen, writing to the buffer memory 38 proceeds in the order: 4000 address, 4001 address, and so on, and after the 7E7F address is reached, proceeds in the order 0000 address, 0001 address, and so on. On the other hand, in an LCD panel 72, since display on the upper half of the screen and display on the lower half of the screen are carried out in parallel, reading from the buffer memory 38 proceeds in the order: 0000 address, 4000 address, 0001 address, 4001 address, and so on, with an address corresponding to the upper half of the screen being read alternately with an address corresponding to the lower half of the screen.

Figure 15:
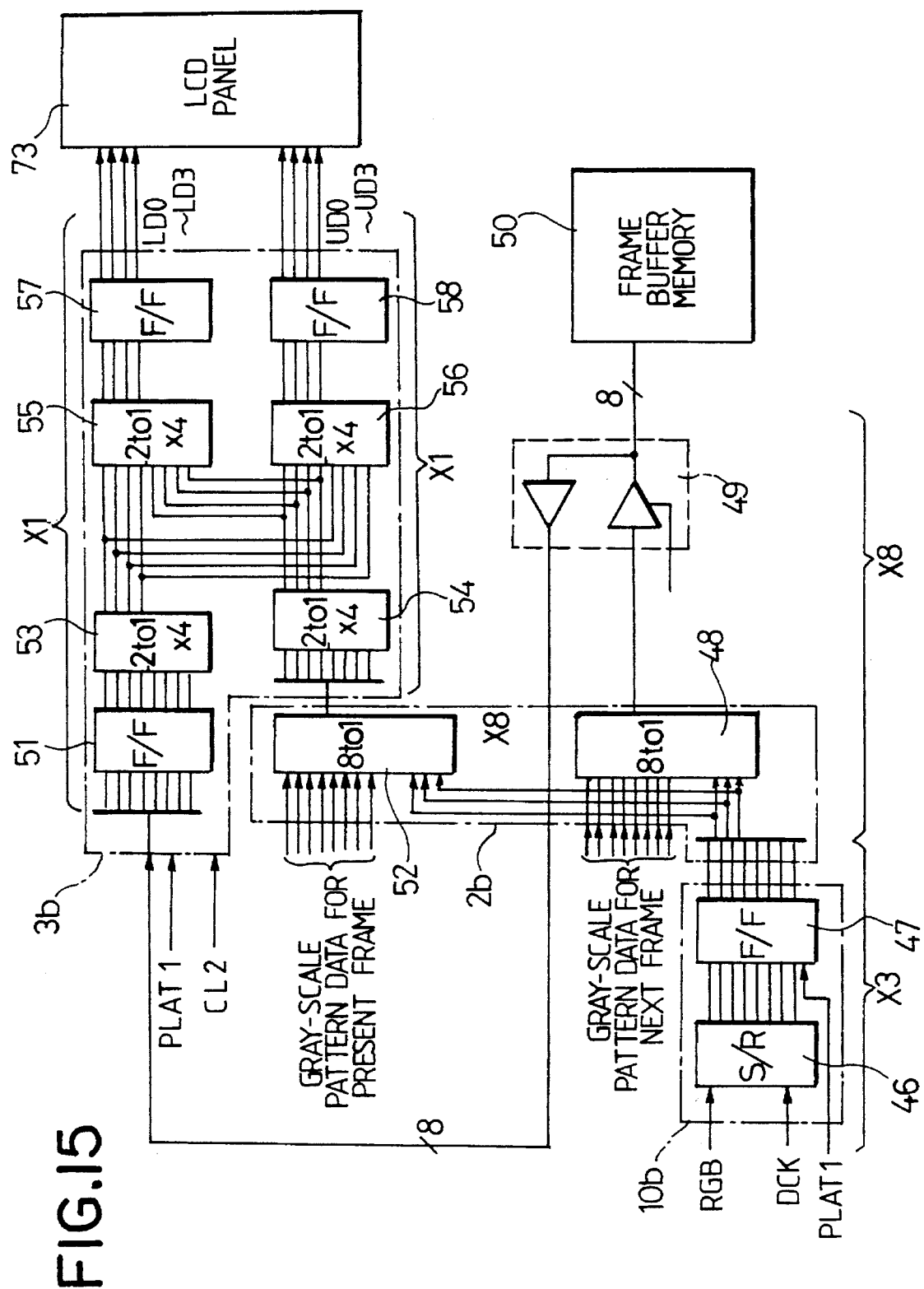
FIG. 15 is a block diagram showing the composition of a data controller of a video signal interface of the third embodiment of the present invention.

Explanation will next be given for a third embodiment of an interface of the present invention. FIG. 15 is a block diagram showing the constitution of the data control system of the interface device of this embodiment. In this interface, the composition of the S/P converters, LCD controllers, and memory controllers is different than is shown in FIG. 2. Also, eight bi-directional buffers of 1-bit width 49 are provided as an interface for the purpose of inputting and outputting data to the frame buffer memory 50. Regarding timing controllers for the purpose of generating various signals necessary for the interface device, no changes to the device shown in FIG. 2 are necessary, and the controller shown in FIG. 2 can be used as is. In the following explanation, the addresses of the frame buffer memory 50 are given in hexadecimal notation.

Explanation will first be given of the S/P converter 10b. A total of three S/P converters are provided, one for each color, red, green and blue. Each S/P converter 10b has a shift register of 8-bit width 46 and a latch circuit of 8-bit width 47. The S/P converter 10b of the present embodiment differs from the S/P converter 10 shown in FIG. 8A in that the output is not split into even bits and odd bits.

A total of eight memory controllers 2b are provided, one corresponding to each bit line of the output data lines (of 8-bit width) from the S/P converter 10b. Each memory controller 2b is provided with two 8-to-1 selectors 48 and 52. To the data input terminal of one selector 48 is inputted from the gray-scale pattern generators the gray-scale data (of 8-bit width) of the frame succeeding the currently displayed frame. To the other selector 52 is inputted from the gray-scale pattern generator the gray-scale data (of 8-bit width) for the currently displayed frame. In addition, based on the signals inputted from these three data lines, each data line being outputted from each S/P converter 10b, each of the selectors 48 and 52 carries out the selection operation. The output of one selector 48 is connected to the frame buffer memory 50 by way of a bi-directional buffer 49, and the output of the other selector 52 is inputted to the LCD controller 3b. Because there are eight memory controllers 8b, the data sent from each of the memory controllers 8b to the frame buffer memory 50 and the LCD controller 3b can be sent as parallel formatted data of 8-bit width.

The frame buffer memory 50 is of 128 Kbits (16 Kbytes). The gray-scale pattern data corresponding to the CRT display data for the lower half of the screen and the gray-scale pattern data corresponding to the CRT display data for the upper half of the screen are stored in a superimposing manner into the area within the frame buffer memory 50 from the 0000 address to the 3E7F address.

To the LCD controller 3b is inputted both a data signal of 8-bit width from the frame buffer memory 50 by way of a respective bi-directional buffer 49, and data from the eight memory controllers 2b. The LCD controller 3b comprises one register 51 of 8-bit width, two registers 57 and 58 of 4-bit width, and four selectors 53 to 56. Register 51 is a latch circuit synchronous with signal PLAT1 and registers 57 and 58 are latch circuits synchronous with shift clock signal CL2. Each of the selectors 53 to 56 are equipped with four 2-to-1 elements.

Parallel data of 8-bit width from the frame buffer memory 50 is inputted to register 51, and a first selector 53 is provided at the output side of register 51. Data of 8-bit width from the memory controllers 8b is inputted to a second selector 54. The output (of 4-bit width) of the first selector 53 is connected to the input terminal of the lower bit side of a third selector 55 and to the input terminal of the upper bit side of a fourth selector 56. The output of the second selector 54 is connected to the input terminal of the upper bit side of the third selector 55 and to the lower bit side of the fourth selector 56. The output of the third and fourth selectors 55 and 56 is outputted by way of registers 57 and 58, respectively, to the LCD panel 73 as lower screen display data LD0 to LD3 and upper screen display data UD0 to UD3, respectively.

Next will be explained the conversion of the CRT display data to LCD display data. FIGS. 13 and 14 are timing charts illustrating the operation upon inputted CRT display data. FIG. 13 corresponds to the leading portion of each line of display data, and FIG. 14 corresponds to the trailing portion of each line of display data.

CRT display data is synchronized with dot clock signal DCK and taken into the shift register 46 of S/P converter 10b. Gray-scale pattern data for the address 0000 corresponding to the lower half of the screen is then read from frame buffer memory 50 in accordance with output enable signal OE0. Display data that has been made synchronous with signal PLAT1 and converted to 8-bit width is taken into register 47 of the S/P converter 10b, and at the same time, data read from address 0000 of the buffer memory is taken into register 51 of the LCD controller 3b.

Selection of gray-scale pattern data (of 8-bits width) is carried out at the other selector 52 of each memory controller 2b based on the CRT display data. The selected gray-scale pattern data Is used as is as the data for the upper half of the screen. Accordingly, this data is not written to the frame buffer memory 50, and instead, based on the display data, the gray scale pattern data for the next frame is selected at one selector 48 and this gray-scale data is written into the 0000 address of the frame buffer memory 50 in accordance with write enable signal WE0. This address is an address corresponding to the upper half of the screen. At this time, the gray-scale pattern data displayed on the upper half of the LCD panel 73 and the gray-scale pattern data displayed on the lower half of the LCD panel 73 are complete.

On the LCD panel 73, four dots are displayed at the same timing on both the upper half of the screen and the lower half of the screen. Here, the selection of either the upper 4 bits or the lower 4 bits of the 8 bits of data is carried out by the first and second selectors 53 and 54 within the LCD controllers 3b. The data that has been altered to 4 bits passes through the third and the fourth selector 55 and 56 and reaches either register 57 or 58. Here, the third or fourth selector 55 or 56 switches the correlation between the first or second selector 53 or 54 and register 57 or 58 depending on whether the CRT display data corresponds to the lower half of the screen or the upper half of the screen. The data taken into each of the registers 57 and 58 is then outputted as lower screen data or upper screen data, accordingly.

The operation for the succeeding addresses is carried out in the same manner. In other words, as data corresponding to the lower screen half is read out from the frame buffer memory 50, gray-scale pattern data corresponding to the next frame is written into the same address and outputted to the LCD panel 73. By repeating this operation cycle, when the 200th line of the CRT display is reached, or in other words, when the display area of the upper screen half has been completed on the CRT side, one screen will be displayed on the LCD panel 73. At this point, the data for the upper screen half of the next frame will have been stored in the frame buffer memory 50.

When the display on the CRT reaches the 201st line, i.e., when display of the lower half of the screen begins, as data for the upper half of the screen is being read out from the frame buffer memory 50, the gray-scale pattern data corresponding to the lower half of the screen for the next frame is being written into the same addresses, and display data is being outputted to the LCD panel 73. At the time when one screen of display is finished for the CRT display, two screens of display are completed for the LCD panel 73. At this time, data for the lower half of the screen is being stored into frame buffer memory 50.

In any case, by inputting the display data for one screenful on the CRT, display data for two screenfuls on the LCD panel have been generated. At this time, the frame frequency for the LCD screen is double the frame frequency of the CRT. In addition, because the same addresses of the frame buffer memory are used to store data for the upper screen half as for the lower screen half, the present embodiment requires a frame buffer memory of even less capacity than is required in the second embodiment.

Figure 16:
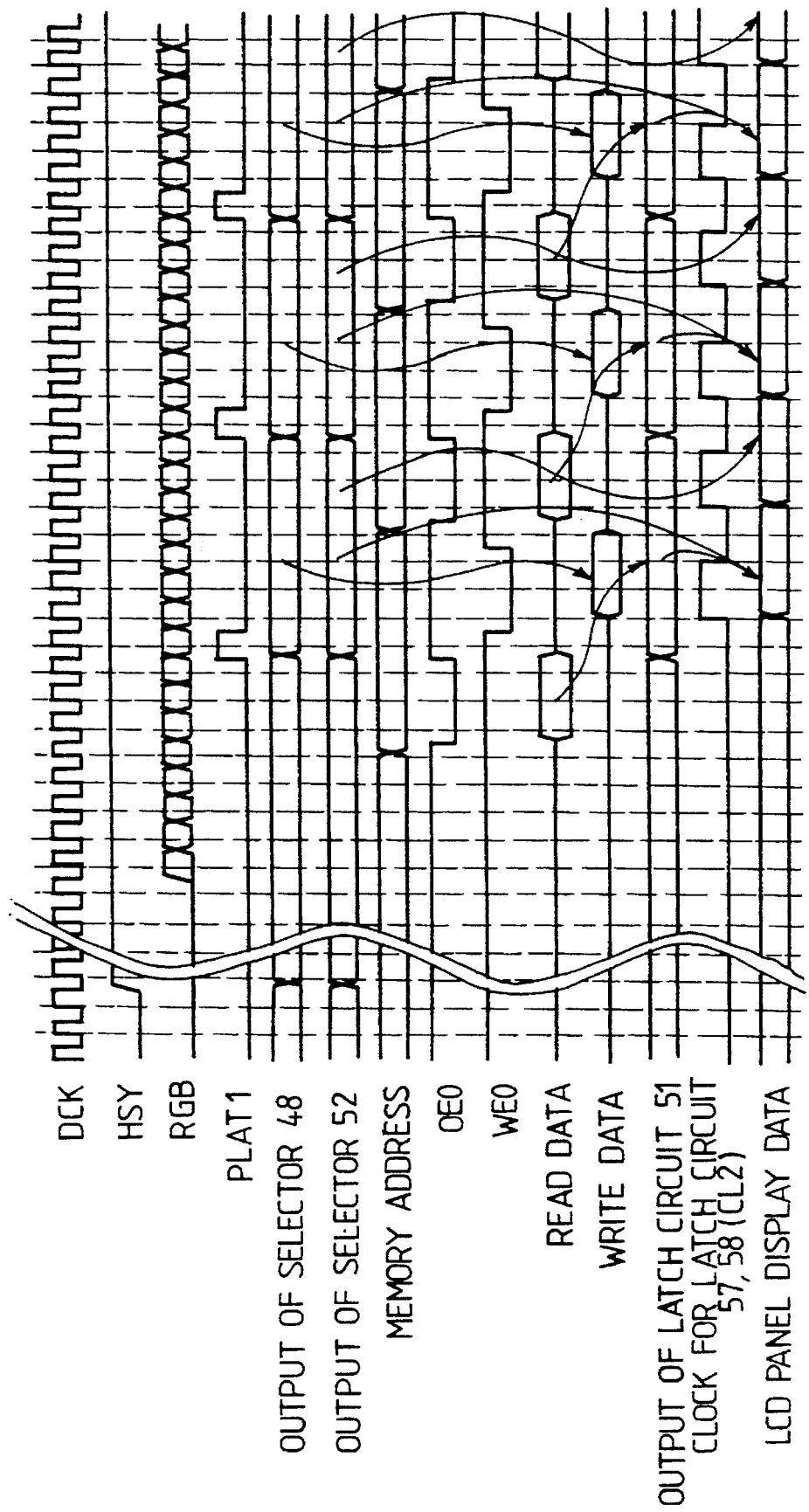
FIG. 16 is a timing chart illustrating the operation of the device shown in FIG. 15 in relation to the display data corresponding to the first portion of each scan line.

The relation between the display position on the LCD panel and the address in the frame buffer memory 50 is as shown in FIG. 16. In this figure, the "0000" in the upper left corner corresponds to the data for the first 8 dots in the uppermost displayed line and shows that the data is stored in the address "0000." The left edge of the 201st line is also labeled "0000" and it can be understood that the data corresponding to the first 8 dots in this displayed line is also stored In the "0000" address.

Figure 17:
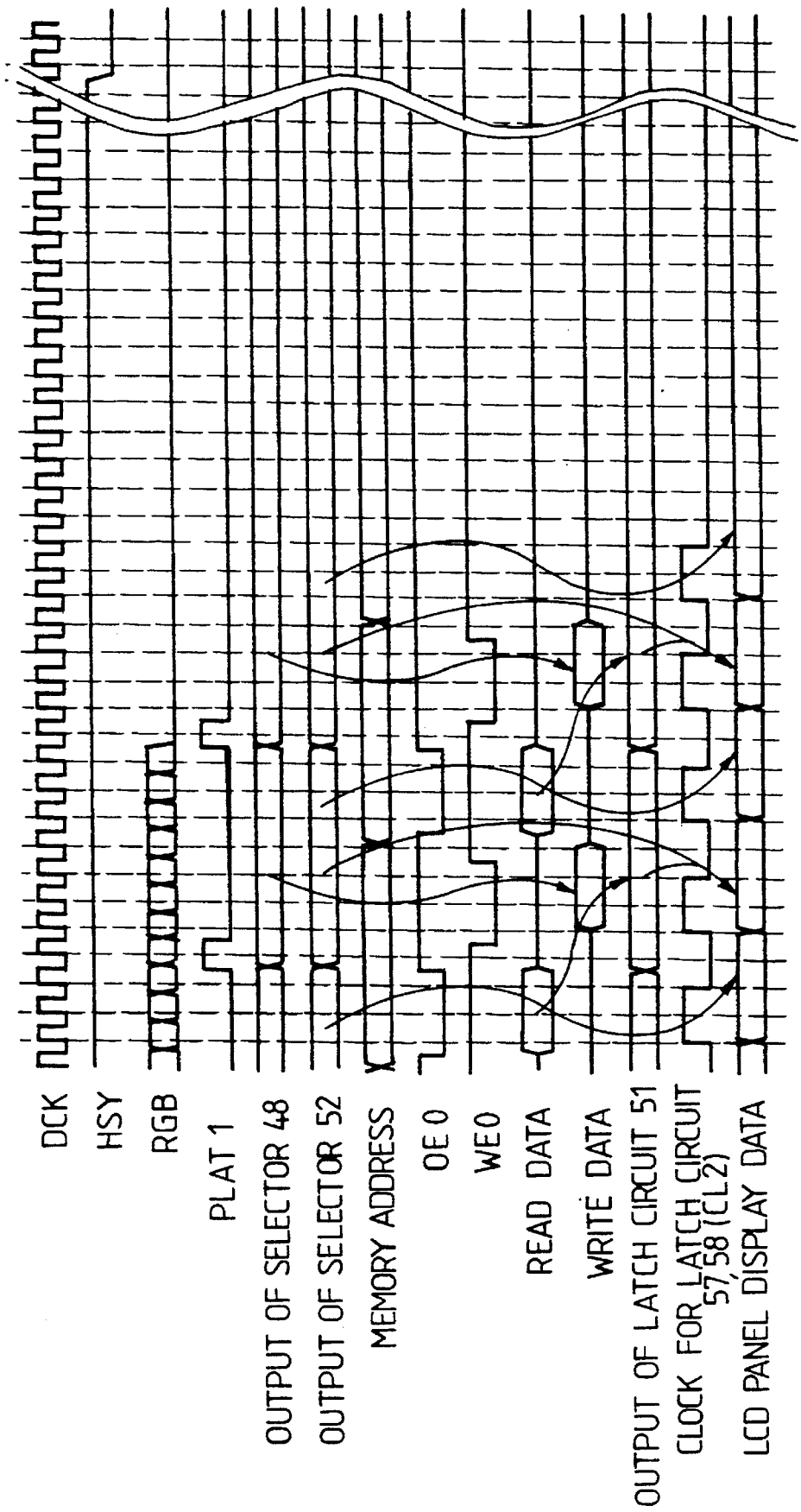
FIG. 17 is a timing chart illustrating the operation of the device shown in FIG. 15 in relation to the display data corresponding to the last portion of each scan line.

In this device, the writing and reading of data to the frame buffer memory 50 is carried out in an alternating manner. FIG. 17 shows the way in which the read addresses and the write addresses change. In this embodiment, as described above, when data is read from one address, data is written back into the same address.

It is to be understood that variations and modifications of a video signal interface disclosed herein will be evident to those who skilled in the art. It is intended that all such modifications and variations be included within the scope of the appended claims.

What is claimed is:

1. In a video signal interface that converts display data in serial format for a first display device to display data appropriate to a second display device, said second display device having pixels capable of binary display and carrying out gray-scale display as a pseudo operation by switching with every frame between the binary displays to be carried out at every pixel, a video signal interface comprising:

S/P converter means for converting said serially formatted display data to parallel data;

pattern generating means for holding gray-scale pattern data according to the number of gradations that can be displayed by said second display device and outputting with every frame unit of said second display device data corresponding to the type of binary display in accordance with said gray-scale pattern data;

memory means, having a number of bits equal to half the number of pixels of said second display means, for storing said display data appropriate to said second display means;

data generating means for generating display data of parallel format for use in said second display device based on both the output of said pattern generating means and the gradations of said converted display data;

memory control means for writing data generated by said data generating means to said memory means and for reading the data from said memory means;

address generating means for generating addresses corresponding to said memory means; and output means for outputting data read from said memory means at timing matched with the operation of said second display device;

wherein the correlation between the memory addresses and the pixels of the second display is fixed;

wherein said pattern generating means has both a register and a gray-scale pattern generating circuit, said register being accessible to outside of said video signal interface and holding gray-scale pattern data, and said gray-scale pattern generating circuit outputting data corresponding to one of either binary display based on said gray-scale pattern data and in accordance with a clock signal to said LCD device.

2. A video signal interface according to claim 1 wherein said first display device carries out display at only one pixel with every cycle of the clock signal and in addition performs display of one screen by successively carrying out display to each pixel, and said second display device carries out display at a plurality of pixels with every cycle of the clock signal based on display data in parallel format.

3. A video signal interface according to claim 2 wherein one screen of said second display device is logically divided into two equal portions, a first portion and a second portion, in which display on said first portion and said second portion is carried out at the same timing.

4. A video signal interface according to claim 2, wherein said first display device is a CRT (cathode-ray tube) display device and said second display device is an LCD (Liquid Crystal Display) device.

5. A video signal Interface according to claim 4 wherein the screen of said LCD device is logically divided into two equal portions, a first portion and a second portion, in which display to said first portion and said second portion is carried out at the same timing.

6. A video signal interface according to claim 5 wherein the frame frequency of said LCD device coincides with the frame frequency of said CRT display device, and wherein display data is outputted such that the display of one screen on said LCD display device corresponds to the display of one screen on said CRT display device.

7. A video signal interface according to claim 6, wherein each bit in said memory means has a one-to-one correspondence with each pixel of said LCD device, during the time when display data for said CRT display device is data corresponding to said first portion, data corresponding to said first portion is written sequentially to said memory means while at the same time data corresponding to said first and said second portions is alternately read from said memory means, and during the time when display data for said CRT display device is data corresponding to said second portion, data corresponding to said second portion is written sequentially to said memory means while at the same time data corresponding to said first and second portions is alternately read from said memory means.

8. A video signal interface according to claim 4, wherein said CRT display device is capable of displaying color, the display data for every pixel being of three bits, the three bits of said display data corresponding respectively to the colors red, green and blue.

9. A video signal interface according to claim 8 wherein the display of eight gradations may be performed on said LCD device.

10. A video signal interface according to claim 5, wherein the frame frequency of said LCD device is twice the frame frequency of said CRT display device, and wherein display data is outputted such that the display of two screens on said LCD display device corresponds to the display of one screen on said CRT display device.

11. A video signal interface according to claim 10, wherein each bit in said memory means has a duplicated correspondence with one pixel in said first portion and one pixel in said second portion, during the time when display data for said CRT display device is data corresponding to said first portion, data corresponding to said first portion is written sequentially to said memory means, and at the same time, data corresponding to said second portion is sequentially read from said memory means, data corresponding to said first portion is directly outputted to said LCD device, and during the time when display data for said CRT display device is data corresponding to said second portion, data corresponding to said second portion is written sequentially to said memory means, while at the same time, data corresponding to said first portion is sequentially read from said memory means, and data corresponding to said second portion is directly outputted to said LCD device.

12. A video signal interface according to claim 1, wherein said gray-scale pattern data applied to adjoining pixels in the same line are different from one another.

13. A video signal interface according to claim 1, wherein said gray-scale pattern data applied to a pixel in one frame and in a successive frame are different from one another.

* * * * *